US011798269B2

(12) United States Patent
Xie et al.

(10) Patent No.: US 11,798,269 B2
(45) Date of Patent: Oct. 24, 2023

(54) FAST NON-MAXIMUM SUPPRESSION ALGORITHM FOR OBJECT DETECTION

(71) Applicant: Kneron (Taiwan) Co., Ltd., Taipei (TW)

(72) Inventors: Bike Xie, San Diego, CA (US); Hung-Hsin Wu, San Diego, CA (US); Chuqiao Song, San Diego, CA (US); Chiu-Ling Chen, Hsinchu County (TW)

(73) Assignee: Kneron (Taiwan) Co., Ltd., Taipei (TW)

( * ) Notice: Subject to any disclaimer, the term of this patent is extended or adjusted under 35 U.S.C. 154(b) by 380 days.

(21) Appl. No.: 17/203,700

(22) Filed: Mar. 16, 2021

(65) Prior Publication Data

US 2022/0300739 A1 Sep. 22, 2022

(51) Int. Cl.
| | |
|---|---|
| *G06V 10/82* | (2022.01) |
| *G06T 5/00* | (2006.01) |
| *G06N 3/08* | (2023.01) |
| *G06V 20/00* | (2022.01) |
| *G06N 3/048* | (2023.01) |

(52) U.S. Cl.
CPC ............ *G06V 10/82* (2022.01); *G06N 3/048* (2023.01); *G06N 3/08* (2013.01); *G06T 5/001* (2013.01); *G06V 20/00* (2022.01); *G06T 2207/20024* (2013.01)

(58) Field of Classification Search
CPC .......... G06N 3/048; G06N 3/08; G06V 20/00; G06V 10/82; G06T 5/00; G06T 2207/20024
See application file for complete search history.

(56) References Cited

U.S. PATENT DOCUMENTS

| | | | |
|---|---|---|---|
| 10,133,933 B1 | 11/2018 | Fisher | |
| 11,238,314 B2 * | 2/2022 | Chadha | ................. G06V 10/82 |
| 2020/0074393 A1 | 3/2020 | Fisher | |

(Continued)

FOREIGN PATENT DOCUMENTS

| | | |
|---|---|---|
| CN | 111126472 A | 5/2020 |
| CN | 111524145 A | 8/2020 |

OTHER PUBLICATIONS

Zhang, et al. (Efficient Hardware Post Processing of Anchor-Based Object Detection on FPGA), pp. 1-6. (Year: 2020).*

(Continued)

*Primary Examiner* — Daniel G Mariam
(74) *Attorney, Agent, or Firm* — Winston Hsu (57) ABSTRACT

A Fast Non-Maximum Suppression (NMS) Algorithm post-processing for object detection includes getting original data output from a deep learning model inference output, the original data including a plurality of bounding boxes, pre-emptively filtering out at least one bounding box of the plurality of bounding boxes from further consideration when applying the algorithm, the at least one bounding box filtered out according to a predetermined criteria, processing data, using sigmoid functions or exponential functions, from bounding boxes of the plurality of bounding boxes not filtered out to generate processed bounding boxes, calculating final scores of the processed bounding boxes, and choosing a processed bounding boxes utilizing the final scores.

10 Claims, 10 Drawing Sheets

(56) References Cited

U.S. PATENT DOCUMENTS

2022/0147748 A1\*  5/2022  Nagori .................. G06V 40/10
2022/0207305 A1\*  6/2022  Mosayyebpour Kaskari ..............
                                                    G06F 18/253

OTHER PUBLICATIONS

Symeonidis, et al. (Improving Neural Non-Maximum Suppression for Object Detection by Exploiting Interest-Point Detectors), pp. 1-6. (Year: 2019).\*

\* cited by examiner

FIG. 1

| Values | Equals to | Shape |
|---|---|---|
| box_confidence | sigmoid(out[..., 4:5]) | (13,13,3,1) |
| box_class_probs | sigmoid(out[..., 5:]) | (13,13,3,80) |
| box_scores | box_confidence * box_class_probs | (13,13,3,80) |
| box_xy | sigmoid(out[..., :2]) | (13,13,3,2) |
| box_wh | exp(out[..., 2:4]) | (13,13,3,2) |

FIG. 2

| Values | Equals to | Shape |
|---|---|---|
| box_confidence | sigmoid(out[..., 4:5]) | (1,3,80,80,1) |
| box_class_probs | sigmoid(out[..., 5:]) | (1,3,80,80,80) |
| box_scores | box_confidence * box_class_probs | (1,3,80,80,80) |
| box_xy | sigmoid(out[..., :2]) | (1,3,80,80,2) |
| box_wh | sigmoid(out[..., 2:4]) | (1,3,80,80,2) |

FIG. 3

| | N/A (Normal NMS) | FoS = 1, Sigmoid_in_th = -4.59512 | FoS = 4, Sigmoid_in_th = -3.1705 | Sigmoid_in_th = -0.375 |
|---|---|---|---|---|
| Input_Shape | | | 416 | |
| Score_threshold | | | 0.01 | |
| Fast_NMS Type | N/A (Normal NMS) | FoS = 1, Sigmoid_in_th = -4.59512 | FoS = 4, Sigmoid_in_th = -3.1705 | Sigmoid_in_th = -0.375 |
| @0.45 mAP | 0.667 | 0.667 | 0.666 | 0.654 |
| Saved_sigmoids (only cnt prob. input) | 0 | total_saved: 36968103 total_original: 43196400 saved_percent: 85.581% | total_saved: 40857163 total_origin: 43196400 saved_percent: 94.585% | total_saved: 42945983 total_original: 43196400 saved_percent: 99.420% |
| Method | | #2 | #3 | #1 |

FIG. 4A

| Input_Shape | 608 | | |
|---|---|---|---|
| Score_threshold | 0.01 | | |
| Fast_NMS Type | N/A (Normal NMS) | FoS = 1, Sigmoid_in_th = -4.59512 | FoS = 4, Sigmoid_in_th = -3.1705 | Sigmoid_in_th = -0.375 |
| @0.45 mAP | 0.582 | 0.582 | 0.582 | 0.566 |
| Saved_sigmoids (only cnt prob. input) | 0 | total_saved: 78155753<br>total_origin: 92271600<br>saved_percent: 84.702% | total_saved: 86927982<br>total_original: 92271600<br>saved_percent: 94.209% | total_saved: 91810674<br>total_original: 92271600<br>saved_percent: 99.500% |
| Method | | #2 | #3 | #1 |

FIG. 4B

| Input_Shape | | 416 | | |
|---|---|---|---|---|
| Score_threshold | | 0.01 | | |
| Fast_NMS Type | N/A (Normal NMS) | FoS = 1, Sigmoid_in_th = -4.59512 | FoS = 4, Sigmoid_in_th = -3.1705 | Sigmoid_in_th = -0.375 |
| @0.45 mAP | 0.829 | 0.829 | 0.825 | 0.808 |
| Saved_sigmoids (only cnt prob. input) | 0 | total_saved: 161727490 total_original: 181424880 saved_percent: 89.143% | total_saved: 174600160 total_original: 181424880 saved_percent: 96.238% | total_saved: 180424885 total_original: 181424880 saved_percent: 99.449% |
| Method | | #2 | #3 | #1 |

FIG. 5A

| Input_Shape | 608 | | |
|---|---|---|---|
| Score_threshold | 0.01 | | |
| Fast_NMS Type | N/A (Normal NMS) | FoS = 1, Sigmoid_in_th = -4.59512 | FoS = 4, Sigmoid_in_th = -3.1705 | Sigmoid_in_th = -0.375 |
| @0.45 mAP | 0.835 | 0.835 | 0.835 | 0.815 |
| Saved_sigmoids (only cnt prob. input) | 0 | total_saved: 3402459377<br>total_origin: 3875407020<br>saved_percent: 87.796% | total_saved: 3709963122<br>total_original: 3875407020<br>saved_percent: 95.731% | total_saved: 3855147922<br>total_original: 3875407020<br>saved_percent: 99.477% |
| Method | | #2 | #3 | #1 |

FIG. 5B

| Input_Shape | 416 | | |
|---|---|---|---|
| Score_threshold | 0.01 | | |
| Fast NMS Type | N/A (Normal NMS) | FoS = 1, Sigmoid_in_th = -4.59512 | FoS = 4, Sigmoid_in_th = -3.1705 | Sigmoid_in_th = -0.375 |
| @0.45 mAP | 0.829 | 0.829 | 0.825 | 0.808 |
| Saved_sigmoids (only cnt prob. input) | 0 | total_saved: 161727490 total_original: 181424880 saved_percent: 89.143% | total_saved: 174600160 total_original: 181424880 saved_percent: 96.238% | total_saved: 180424885 total_original: 181424880 saved_percent: 99.449% |
| Method | | #2 | #3 | #1 |

FIG. 6A

| Input_Shape | 416 | | | |
|---|---|---|---|---|
| Score_threshold | 0.01 | | | |
| Fast_NMS Type | Step2_only<br>FoS_1 = 2<br>FoS_2 = 1 | Step2_only<br>FoS_1 = 3<br>FoS_2 = 1 | Step2_only<br>FoS_1 = 4<br>FoS_2 = 1 | Step2_only<br>FoS_1 = 4<br>FoS_2 = 2 |
| @0.45 mAP | 0.829 | 0.828 | 0.826 | 0.825 |
| Saved_sigmoids<br>(only cnt prob. input) | total_saved: 181406495<br>total_original: 181424880<br>saved_percent: 99.990% | total_saved: 181406679<br>total_original: 181424880<br>saved_percent: 99.990% | total_saved: 181406767<br>total_original: 181424880<br>saved_percent: 99.990% | total_saved: 199295777<br>total_original: 199311840<br>saved_percent: 99.992% |
| Method | #4 | #4 | #4 | #4 |

FIG. 6B

| Input_Shape | 608 | | | |
|---|---|---|---|---|
| Score_threshold | 0.01 | | | |
| Fast_NMS Type | N/A (Normal NMS) | FoS = 1 Sigmoid_in_th = -4.59512 | FoS = 4 Sigmoid_in_th = -3.1705 | Sigmoid_in_th = -0.375 | Fast_NMS_2, FoS = 4 (1) filter by box_prob & (2) filter by box_conf |
| @0.45 mAP | 0.835 | 0.835 | 0.835 | 0.815 | 0.835 |
| Saved_sigmoids (only cnt prob. input) | 0 | total_saved: 340245937 total_origin: 387540720 saved_percent: 87.796% | total_saved: 370996312 total_original: 387540720 saved_percent: 95.731% | total_saved: 385514792 total_original: 387540720 saved_percent: 99.477% | total_saved: 377031792 total_original: 387540720 saved_percent: 97.288% |
| Method | | #2 | #3 | #1 | #4 |

FIG. 7

FAST NON-MAXIMUM SUPPRESSION ALGORITHM FOR OBJECT DETECTION

BACKGROUND OF THE INVENTION

1. Field of the Invention

This application relates to a Non-Maximum Suppression Algorithm for Object Detection, and more particularly to a Fast Non-Maximum Suppression Algorithm for Object Detection with reduced calculation and power requirements.

2. Description of the Prior Art

An object detection deep learning algorithm normally has three major steps—Preprocess, Deep learning model inference, and Post-process.

Preprocess processes the original image to fit the model input size. Usually, this step includes image crop, resize, padding, and pixel value normalization.

Deep learning model inference normally includes inputting the preprocessed image data and outputting the model results. For object detection deep learning model models, the output normally includes bounding box confidence score, class score, bounding box position (corner coordinates or center coordinates+box size).

Post-process normally includes receiving the results of the model that includes many bounding boxes, each with a box position, confidence score, and class score. The winning bounding box is selected based on score and position.

NMS (Non-Maximum Suppression) is a commonly used post-processing method for object detection. SSD (Single Shot [MultiBox] Detector), YOLO (You Only Look Once), and other anchor based object detection deep learning frameworks are using NMS as a post-processing model.

NMS might be slow and consume large amounts of energy due to requiring a huge amount of exponential and/or sigmoid function calculations. Either of these two functions is computationally heavy for edge devices and embedded chips.

SUMMARY OF THE INVENTION

To address the above problems, a Fast Non-Maximum Suppression (NMS) Algorithm post-processing for object detection is proposed that includes getting original data output from a deep learning model inference output, the original data including a plurality of bounding boxes, pre-emptively filtering out at least one bounding box of the plurality of bounding boxes from further consideration when applying the algorithm, the at least one bounding box filtered out according to a predetermined criteria, processing data, using sigmoid functions or exponential functions, from bounding boxes of the plurality of bounding boxes not filtered out to generate processed bounding boxes, calculating final scores of the processed bounding boxes, and choosing a processed bounding boxes utilizing the final scores.

These and other objectives of the present invention will no doubt become obvious to those of ordinary skill in the art after reading the following detailed description of the preferred embodiment that is illustrated in the various figures and drawings.

DETAILED DESCRIPTION

Although an NMS (Non-Maximum Suppression) post-processing method for object detection applied in examples of the YOLO (You Only Look Once) family is used is in this application to help explain the inventive concept, the inventive concept is not limited to YOLO, and may equally well be applied to NMS post-processing when using SSD (Single Shot [MultiBox] Detector) and other anchor based object detection deep learning frameworks.

A General Summary of an Example NMS Post-Processing as Conventionally Used is the Following Five Steps.

Step 1) Get confidence_score, class_score, box_pos_info original data output from the deep learning model inference output.

Step 2) Process these data using sigmoid functions or exponential functions.

Step 3) Calculate box final_score=confidence_score*max (class_score).

Step 4) Filter out box with too small final_score(confidence_th).

Step 5) For the rest of the boxes:
  5a) Choose the box with the highest final_score.
  5b) Filter out boxes which are positionally close to the current chosen box (IOU>th).
  5c) If it has more boxes, return to step 5a, otherwise done.

NMS Pseudo Code

Implementation: BaseYoloPostProcess.nms_boxes()
Termonology: iou=intersection over union argmax is an operation that finds the argument that gives the maximum value from a target function
Input: $\beta=\{b_1, \ldots, b_N\}$, $S=\{s_1, \ldots, s_N\}$, $N_t$
$\beta$ is the list of initial detection boxes
S contains corresponding detection scores
$N_t$ is the NMS threshold

```
Begin
D ← { }
while β ≠ empty do
    m ← argmax S
```

```
    M ← b_m
    D ← D ∪ M;   β ← β - M
    for b_i in β do
        if iou(M, b_i) >= N_t then
            β ← β - b_i; S ← S - s_i
        end
    end
        return D, S
    end
```

Figure 1:
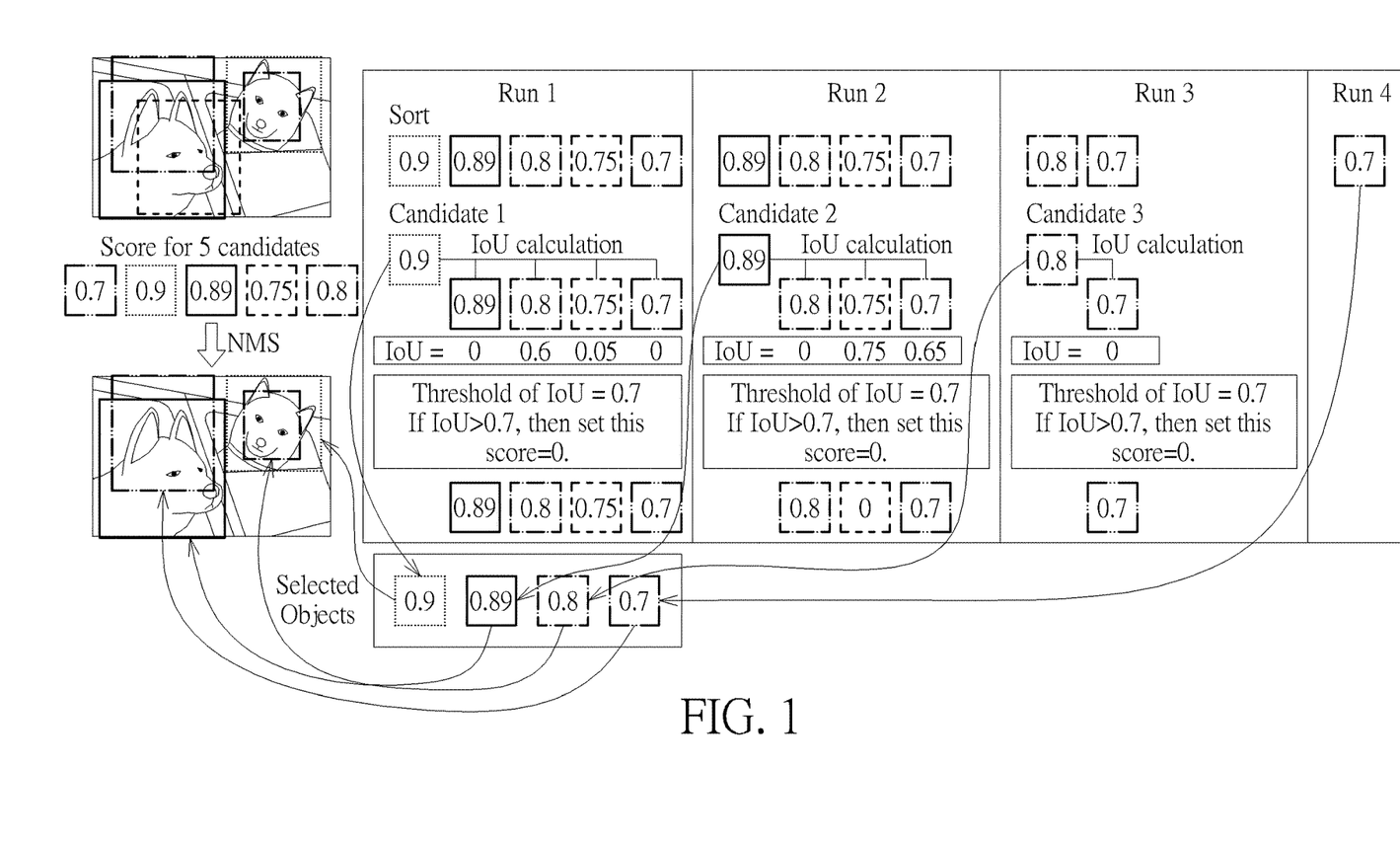
FIG. 1 gives a visual demonstration of step 5 of the NMS algorithm.

FIG. 1 gives a visual demonstration of step 5 of the NMS algorithm. In FIG. 1, the example output of the inference model contains the 5 different bounding boxes and their respective scores for the image shown in the upper left of the figure. In each run, the remaining scores are sorted and the box having the highest score is selected for further processing. With the remaining boxes, the intersection over union (IoU) for the boxes are calculated, with scores of boxes having a level of calculated result greater than a threshold (in this example, the threshold is set to 0.7) set to 0. If a plurality of boxes remain, the remaining boxes are passed to a second run where they are again sorted, high score selected, and IoU calculations done. The process continues until there does not remain a plurality of boxes having a non-zero score as shown.

Figure 2:
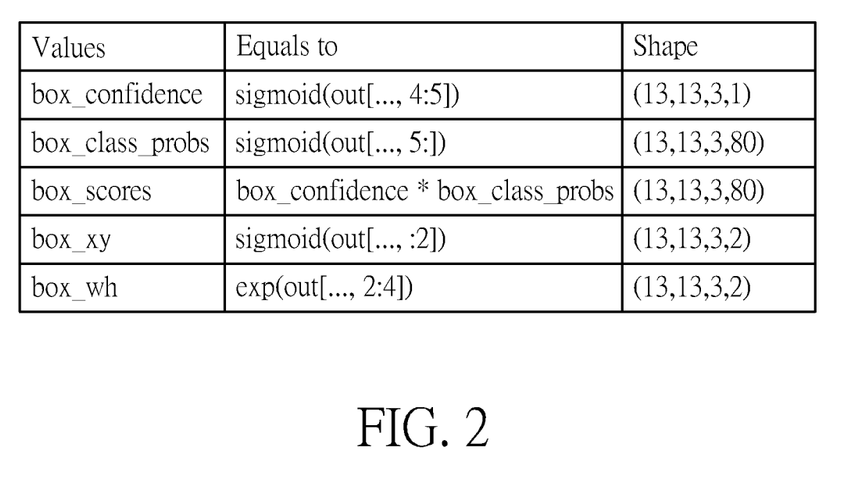
FIG. 2 illustrates sigmoid and/or exponential calculations required by YOLO V3 during NMS.
Figure 3:
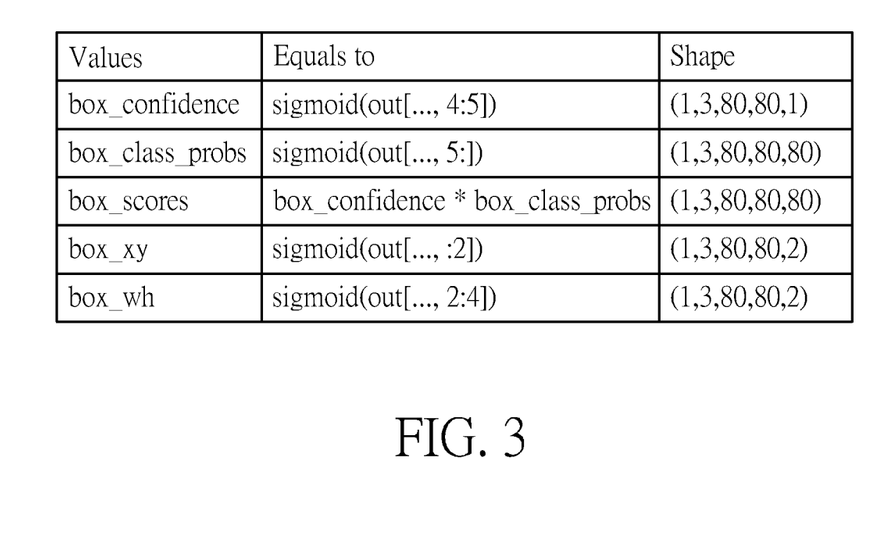
FIG. 3 illustrates sigmoid and/or exponential calculations required by YOLO V5 during NMS.

The above example conventional five-step NMS post-processing method requires a huge number of sigmoid and/or exponential calculations to get the values needed for selection due to large amount of Deep learning model outputted results. Examples of this are shown in FIG. 2 (YOLO V3) and FIG. 3 (YOLO V5). The YOLO V3 post-process, which outputs 3 layers of feature maps, is shown in FIG. 2. Taking the $1^{st}$ layer output of a 416 input_shape as an example: Outs[0].shape=(13, 13, 3, 85) referring to 13 width×13 column×3 anchor×85 channels (1 confidence+80 class score+4 box position) as shown. The similar post-process for YOLO V5 is shown in FIG. 3, and also has 3 layers features maps as outs, outs[0].shape=(1, 3, 80, 80, 85).

Other YOLO and SSD models are similar, as are all Anchor based models. As can be seen in FIG. 2 and FIG. 3, each of the values (box_confidence, box_class_probs, etc.) for each of the bounding boxes needed for selection requires calculating a sigmoid or exponential function, which is computationally intensive, which in turn requires additional energy to perform, both of which can be critical in edge devices and embedded chips.

To overcome the excess computation and energy problem, a Fast NMS algorithm can be used as follows. The basic idea is to introduce a filter between step 1 and step 2 of the above recited algorithm as step 1a, which vastly reduces the number of computations required by pre-emptively removing unnecessary bounding boxes from further processing. This filter can be used with existing YOLO, SSD, and other anchor based post-processing methods without requiring a change in the preprocess or Deep learning model inference models currently used.

A General Summary of a Fast NMS Post-Processing May Comprise the Following Six Steps.

Step 1) Get confidence_score, class_score, box_pos_info original data output from the deep learning model inference output.

Step 1a) Pre-emptively filter out unnecessary bounding boxes from further processing. In this context, further processing means bounding boxes that are filtered by step 1a are removed from further consideration and are not considered when applying steps 2-5 of the post-processing.

Step 2) Process data from the remaining bounding boxes using sigmoid functions or exponential functions.

Step 3) Calculate box final_score=confidence_score*max (class_score).

Step 4) Filter out box with too small final_score(confidence_th).

Step 5) For the rest of the boxes:
5a) Choose the box with the highest final score.
5b) Filter out boxes which are positionally close to the current chosen box (IOU>th).
5c) If it has more boxes, return to step 5a, otherwise done.

Step 1a's term "unnecessary bounding boxes" is defined to mean bounding boxes that are filtered as judged by some criteria by step 1a are removed from further consideration and are not considered when applying steps 2-5 of the post-processing. Some examples of such criteria include, but are not limited to, bounding boxes having a predetermined amount of overlap with bounding boxes that will be further processed, and/or bounding boxes that may be otherwise filtered out in a subsequent step after further processing. An example of this is a bounding box having a class_score less than a threshold, which would cause it to be filtered out in step 4.

The effectiveness of the filter, step 1a, can be thought of as a tradeoff between a reduction in accuracy and reduction of computations, although with the following filtering methods the reduction in accuracy, if any, is heavily outweighed by the benefits to the reduction of computations.

A first embodiment defines "unnecessary bounding boxes" in step 1a as those bounding boxes that have a class_score according to the deep learning model inference output that is less than a predetermined threshold.

$$\text{filter if (class\_score<threshold)} \qquad (1)$$

No further processing is performed on the bounding boxes that fit this criteria. Bounding boxes that are not filtered out by this criteria continue to be processed normally. Because a great many bounding boxes will fit this criteria, a great many sigmoid and/or exponential calculations that would occur in subsequent steps without the filter are saved, speeding up the entire process and reducing power consumption.

A second embodiment defines "unnecessary bounding boxes" in step 1a as those bounding boxes that have a class_score according to the deep learning model inference output that is less than the result of applying an inverse_sigmoid function to a predetermined confidence threshold (confidence_th).

$$\text{filter if(class\_score<inverse\_sigmoid (confidence\_th))} \qquad (2)$$

No further processing is performed on the bounding boxes that fit this criteria. Bounding boxes that are not filtered out by this criteria continue to be processed normally. Because a great many bounding boxes will fit this criteria, a great many sigmoid and/or exponential calculations that would occur in subsequent steps without the filter are saved, speeding up the entire process and reducing power consumption.

A third embodiment defines "unnecessary bounding boxes" in step 1a as those bounding boxes that have a class_score according to the deep learning model inference output that is less than the result of applying an inverse_sigmoid function to the product of a predetermined confidence threshold (confidence_th) and a Factor of Scaling (FoS).

$$\text{filter if(class\_score<inverse\_sigmoid (confidence\_th*FoS))} \qquad (3)$$

No further processing is performed on the bounding boxes that fit this criteria. Bounding boxes that are not filtered out by this criteria continue to be processed normally. Because a great many bounding boxes will fit this criteria, a great many sigmoid and/or exponential calculations that would occur in subsequent steps without the filter are saved, speeding up the entire process and reducing power consumption.

The introduction of the FoS factor in the third embodiment adds a way of balancing performance accuracy and the amount of calculations required. When Fos>1, more calculations are filtered out but may have a performance accuracy loss.

All embodiments each require comparison of some value to a threshold, including the threshold of embodiment 1 and the confidence thresholds (confidence_th) of embodiments 2 and 3. Experiments have led to the derivation of the following formulas to determine possible thresholds.

$$\frac{1}{1+e^{-B}} > Score_{th} \qquad \text{Eq. 4}$$

$$B > \ln\left(\frac{Score_{th}}{1-Score_{th}}\right) \qquad \text{Eq. 5}$$

$$\frac{1}{1+e^{-B}} > Score_{th} * Fos \qquad \text{Eq. 6}$$

$$B > \ln\left(\frac{Score_{th} * Fos}{1-Score_{th} * Fos}\right) \qquad \text{Eq. 7}$$

In equations 4-7, "B" equals a threshold, called here a "sigmoid_in_th", "FoS" equal the Factor of Scaling, and "$Score_{th}$" equals Score threshold.

As an example application of the above 3 embodiments, results will be shown where:

Method 1: set sigmoid_in_th to −0.375

Method 2: directly use threshold value (B) from equation 5 above

Method 3: use FoS=4, apply threshold value B from equation 7

FIG. 4A-5B illustrate results of using the described methods added to various post-processing environments.

Figure 4A:
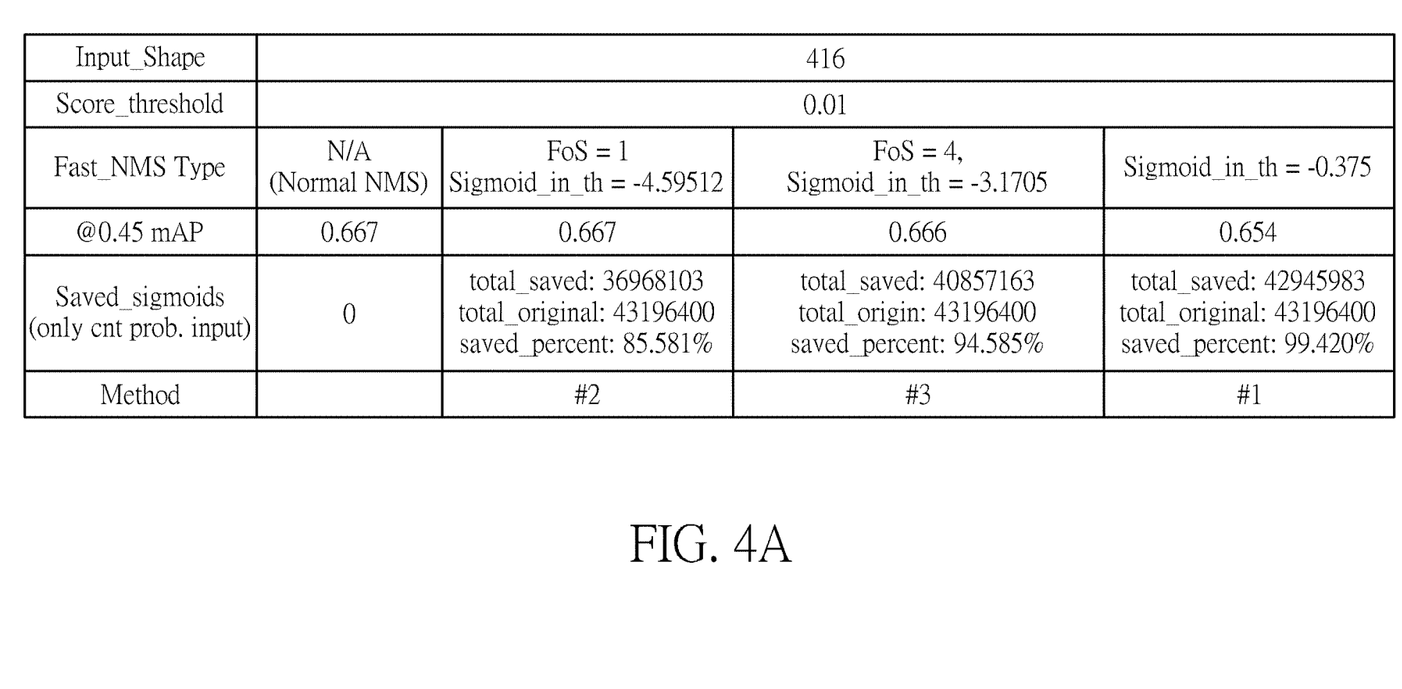
FIG. 4A shows experimental results applied to TinyYOLO V3 using an input shape of 416 and a score threshold of 0.01

FIG. 4A shows experimental results applied to TinyYOLO V3 using an input shape of 416 and a score threshold of 0.01 for each of the standard models, and the 3 above described embodiments of Fast Non-Maximum Suppression Algorithm. As can be seen, the standard model achieves a precision performance of 0.667, a result matched by method 2 with the setting of FoS equal to 1 and Signmoid_in_th equal to −4.59512 (based on equation 5). However, method 2 saves over 85% of the calculations required by the standard model. While impressive, depending on the edge device or embedded chip being used, this may not be enough saving for DSP. FIG. 4A shows similar results for method 3 using FoS equal to 4 and Signmoid_in_th equal to −3.1705, while achieving a much greater savings in calculation even if the performance accuracy drops slightly to 0.666. The results for method 1 save even more calculations (99.42%) but the performance accuracy further drops to 0.654.

Figure 4B:
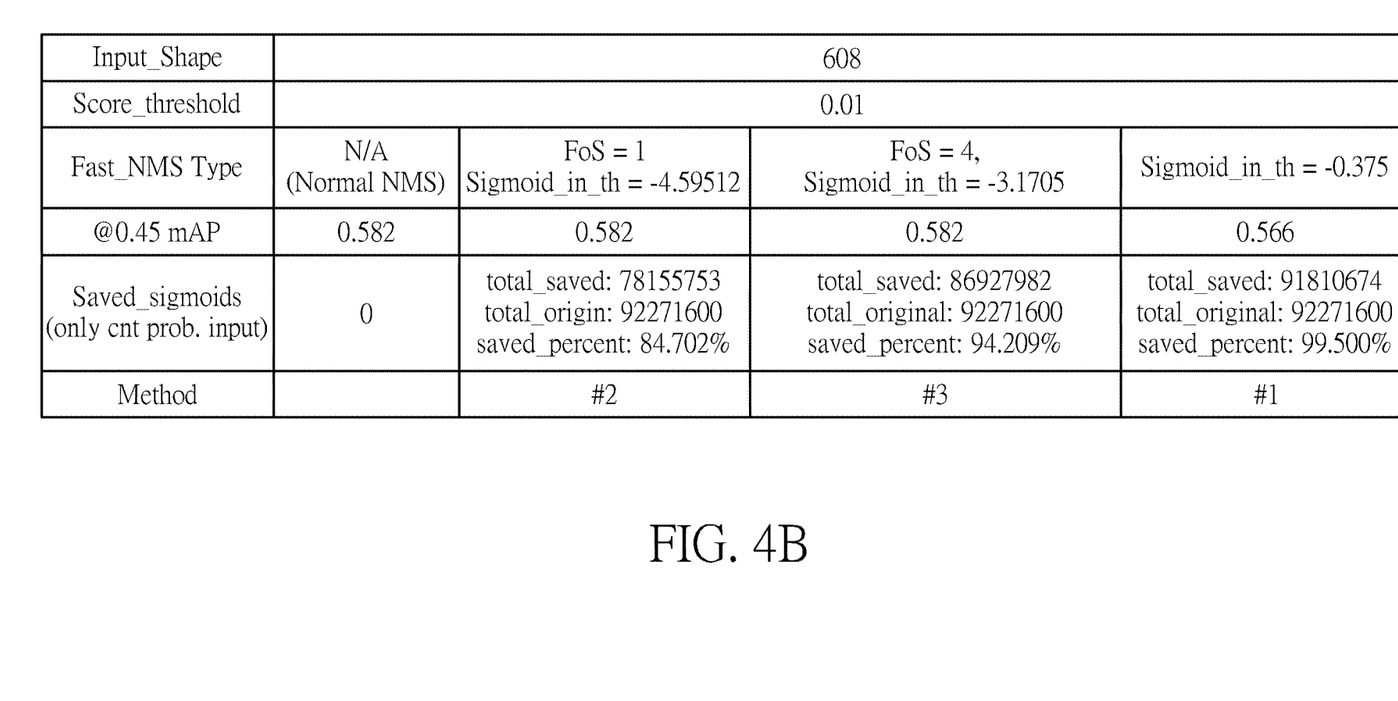
FIG. 4B shows experimental results applied to TinyYOLO V3 using an input shape of 608 and a score threshold of 0.01.

FIG. 4B shows experimental results applied to TinyYOLO V3 using an input shape of 608 and a score threshold of 0.01 for each of the standard models, and the 3 above described embodiments of Fast Non-Maximum Suppression Algorithm. As can be seen, on this larger input size the standard model achieves a precision performance of 0.582, a result again matched by method 2 with the setting of FoS equal to 1 and Signmoid_in_th equal to −4.59512 (based on equation 5). However, method 2 saves over 84% of the calculations required by the standard model, which again may not be enough saving for DSP. FIG. 4B shows similar results for method 3 using FoS equal to 4 and Signmoid_in_th equal to −3.1705, while achieving a much greater savings in calculations while maintaining the same performance accuracy of 0.582. The results for method 1 save even more calculations (99.5%) but the performance accuracy drops a bit to 0.566.

Figure 5A:
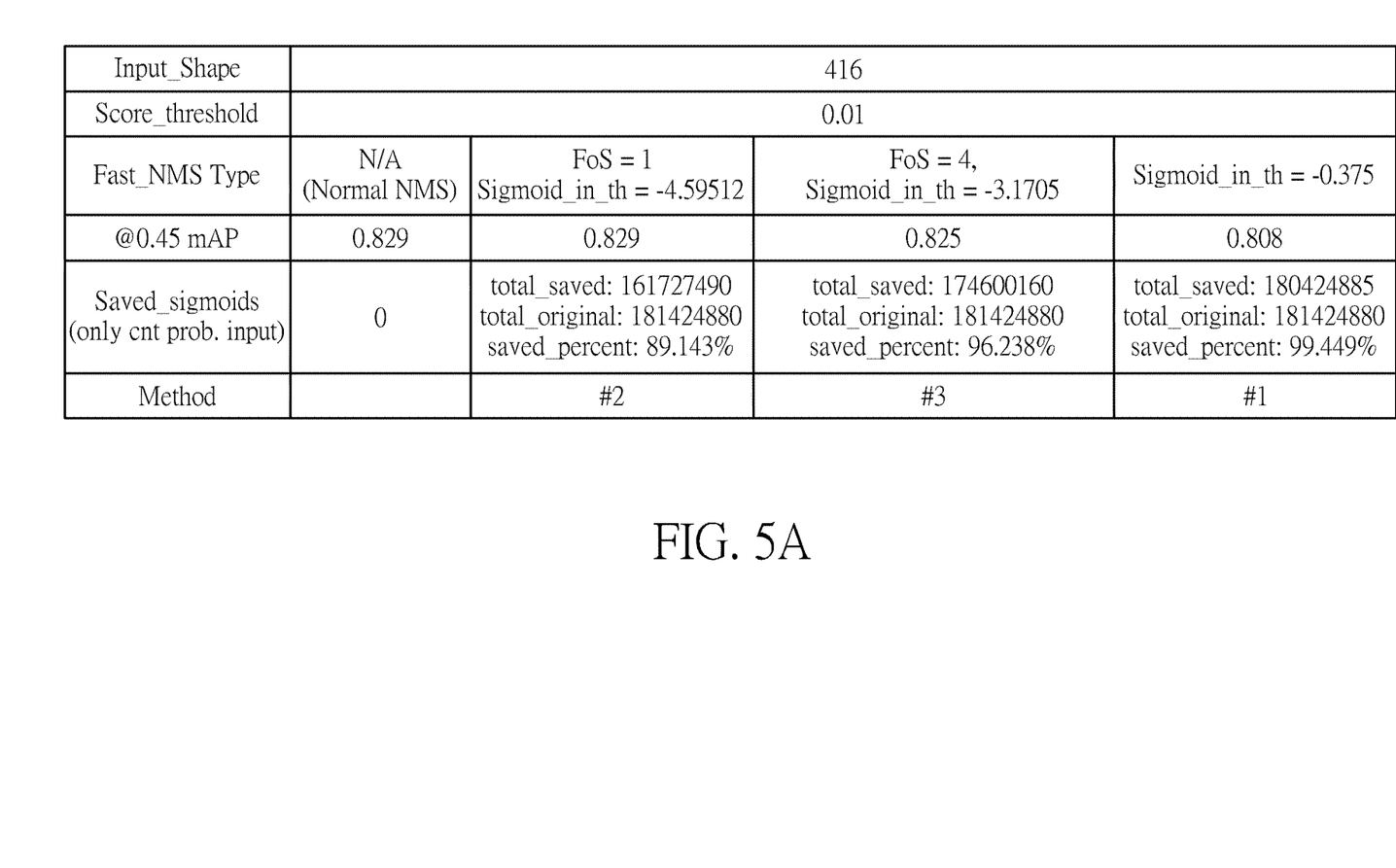
FIG. 5A shows experimental results applied to YOLO V3 using an input shape of 416 and a score threshold of 0.01

FIG. 5A shows experimental results applied to YOLO V3 using an input shape of 416 and a score threshold of 0.01 for each of the standard models, and the 3 above described embodiments of Fast Non-Maximum Suppression Algorithm. As can be seen, the standard model achieves a precision performance of 0.829, a result matched by method 2 with the setting of FoS equal to 1 and Signmoid_in_th equal to −4.59512 (based on equation 7). However, method 2 saves over 89% of the calculations required by the standard model with a slight drop in accuracy performance. FIG. 5A shows similar results for method 3 using FoS equal to 4 and Signmoid_in_th equal to −3.1705, while achieving a much greater savings in calculation (over 96%) even if the performance accuracy drops slightly to 0.825. The results for method 1 save even more calculations (99.469%) but the performance accuracy further drops to 0.808.

Figure 5B:
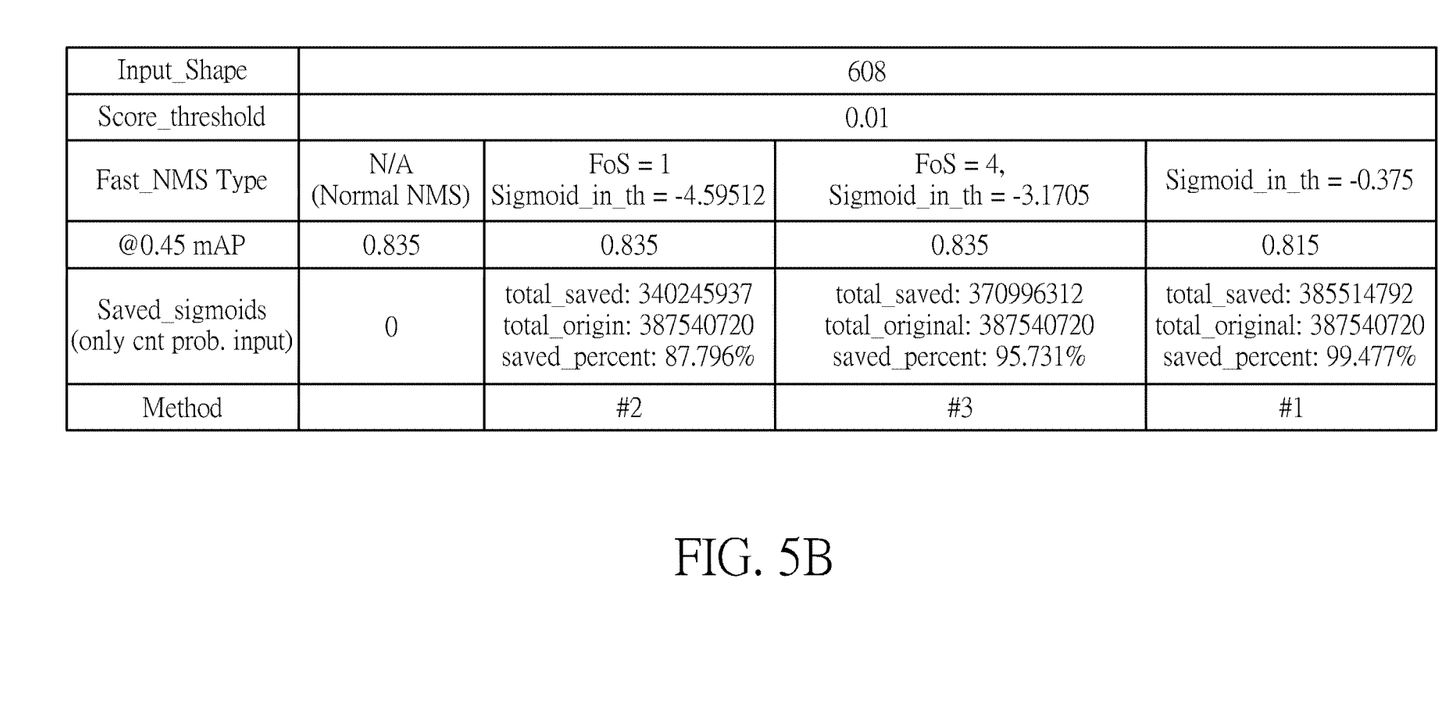
FIG. 5B shows experimental results applied to YOLO V3 using an input shape of 608 and a score threshold of 0.01.

FIG. 5B shows experimental results applied to YOLO V3 using an input shape of 608 and a score threshold of 0.01 for each of the standard models, and the 3 above described embodiments of Fast Non-Maximum Suppression Algorithm. As can be seen, on this larger input size the standard model achieves a precision performance of 0.835, a result again matched by method 2 with the setting of FoS equal to 1 and Signmoid_in_th equal to −4.59512 (based on equation 7). However, here method 2 saves over 87% of the calculations required by the standard model. FIG. 5B shows similar results for method 3 using FoS equal to 4 and Signmoid_in_th equal to −3.1705, while achieving a much greater savings in calculations (95.731%) while maintaining the same performance accuracy of 0.835. The results for method 1 save even more calculations (99.477%) but the performance accuracy drops slightly to 0.815.

Summary of Methods 1-3

For Method 1, a fixed threshold value is not applicable in all cases. A variable value like that used in methods 2 and 3 may be more reasonable. The method saves many sigmoid calculations but −0.375 is a high filter value and the accuracy performance drops more with a low score_th such as 0.01. It may prove more effective with a larger score_th, for example 0.15.

Method 2, as in theory, works the same as conventional post-processing and gets the same output boxes. However, method 2 saves up to around 85%-90% of the sigmoid calculations.

Method 3 saves significant sigmoid calculation at Fos equal to 4; around 94%-96%. Results show that accuracy performance drops only slightly or does not drop at all at FoS equal to 4. Method 3 is a flexible method that can save significant numbers of calculations and having a sigmoid_in_th threshold that can be automatically tuned with different score_th scenarios.

Fourth Embodiment

A fourth embodiment defines "unnecessary bounding boxes" in step 1a as those bounding boxes that have a product of the result of applying a sigmoid function to the confidence_score and the result of applying a sigmoid function to the class_score that is less than a confidence threshold (confidence_th)according to the deep learning model inference output.

$$\text{filter if } ((\text{sigmoid (confidence\_score)}*\text{sigmoid}(\text{class\_score})) < (\text{Score\_th}=0.01)) \quad (8)$$

However, to avoid necessity of using these functions when applying the filter, the fourth embodiment does not calculate the functions and instead uses a lookup table 1 shown here. In Table 1, A is the box confidence_score and B is the class_score.

TABLE 1

| Apply filter if A > ... | Box_Conf. = sigmoid( ) | Class_Prob = sigmoid( ) | Sigmoid_in_th = inv_sigmoid (Class_Prob) B > ... Skip if B < sigmoid_in_th |
|---|---|---|---|
| Step 1 Skip small values in B first | | >0.01 | B > −4.595 |
| Step 2 Follow the mapping A < −4.6 | A = −4.595 | =0.01 | >0.01/ 0.01 = 1 | B > inf (skip all) |
| −4.6 < A <= −3 | A = −3 | =0.047 | >0.01/0.047 = 0.2128 | B > −1.3198 |
| −3 < A <= −2 | A = −2 | =0.119 | >0.01/0.119 = 0.084 | B > −2.3906 |
| −2 < A <= −1 | A = −1 | =0.269 | >0.01/0.269 = 0.037 | B > −4.2540 |
| −1 < A <= 0 | A = 0 | =0.5 | >0.01/0.5 = 0.02 | B > −3.8920 |

For example, suppose a box has a box confidence_score (A) of −4 and a class_score (B) of −1. Locating the row having the appropriate range for A, the table says the box should be skipped if B (−1) is greater than −1.3198, which it is so the box is skipped and not passed on for further processing in subsequent post-processing steps. On the other hand, if the same box had instead had a class_score (B) of −2, which is not greater than −1.3198, the box is not skipped and is passed on for further processing in subsequent post-processing steps.

Embodiment 4 can also be modified to include one or more Factor of Scaling (FoS) components, similar to what was done in previous embodiments. An example lookup table that includes FoS is shown below in Table 2. Again, in Table 2, A is the box confidence_score and B is the class_score. This example uses two different FoS components; FoS1 and FoS2.

TABLE 2

| Apply filter if A > ... | Box_Conf. = sigmoid( ) | Class_Prob = sigmoid( ) | Sigmoid_in_th = inv_sigmoid (Class_Prob) B > ... Skip if B < sigmoid_in_th |
|---|---|---|---|
| Step 1 Skip small values in B first | | >0.01 | B > inv_sigmoid (0.01 * FoS1) |
| Step 2 Follow the mapping A < −4.6 | A = −4.595 | =0.01 | >0.01/ 0.01 = 1 | B > inf (skip all) |
| −4.6 < A <= −3 | A = −3 | =0.047 | >0.01/ 0.047 = 0.2128 | B > inv_sigmoid (0.2128 * FoS2) |
| −3 < A <= −2 | A = −2 | =0.119 | >0.01/ 0.119 = 0.084 | B > inv_sigmoid (0.084 * FoS2) |
| −2 < A <= −1 | A = −1 | =0.269 | >0.01/ 0.269 = 0.037 | B > inv_sigmoid (0.037 * FoS2) |
| −1 < A <= 0 | A = 0 | =0.5 | >0.01/0.5 = 0.02 | B > inv_sigmoid (0.02 * FoS2) |

When implementing table 2, the inv_sigmoid()functions, dependent upon the value of FoS1 or FoS2, can be precalculated once each and the resultant values stored in the table for subsequent use. Otherwise, table 2 is used similarly to table 1 to filter out unnecessary boxes from further consideration.

Theoretically, when Fos1=FoS2=1, there is no performance loss. Practically, FoS1 and FoS2 can be adjusted as a tradeoff between performance accuracy and calculation amount. A typical setting is FoS2=1, FoS1=2~4.

Figure 6A:
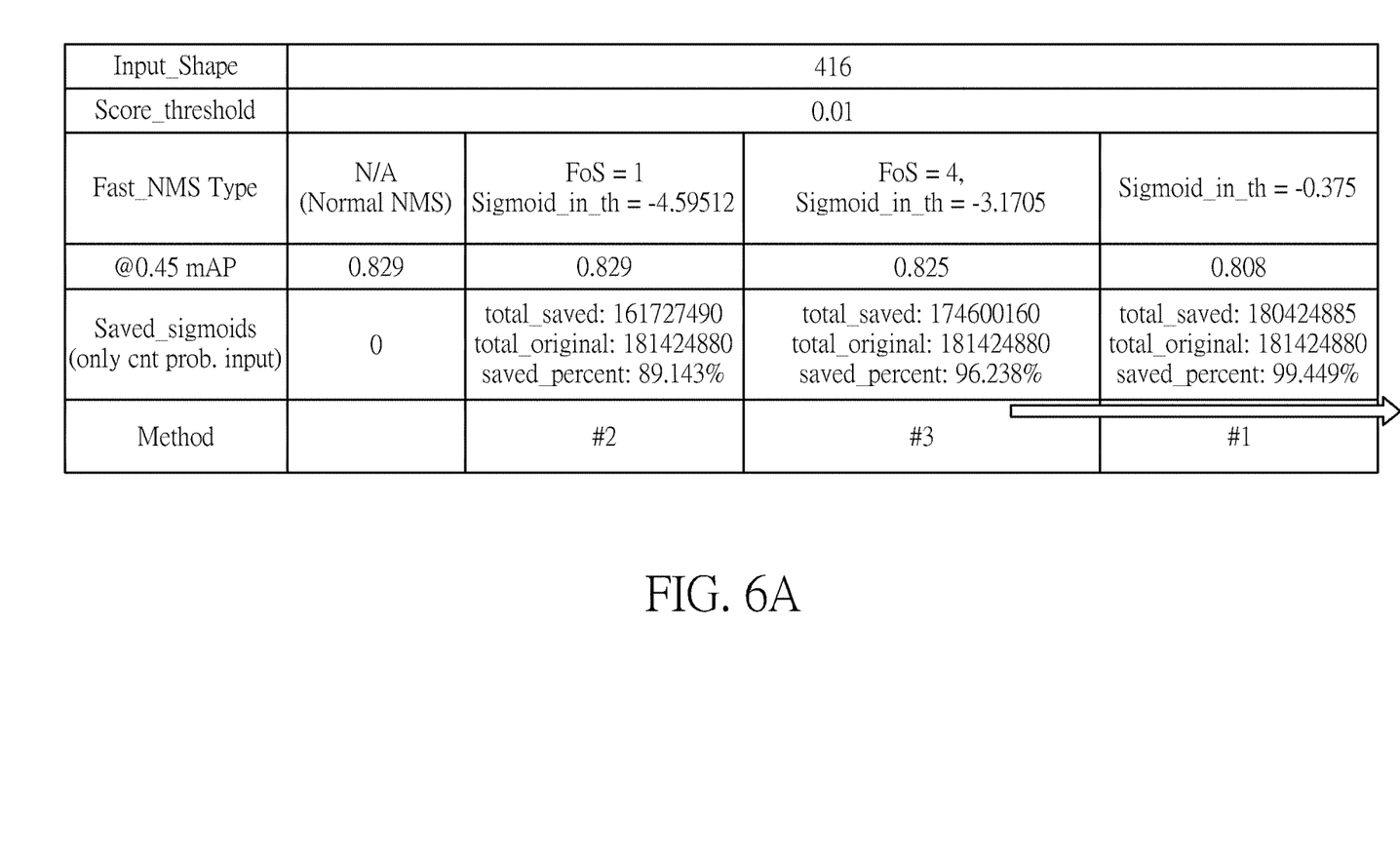
FIG. 6A shows experimental results applied to YOLO V3 using an input shape of 416, a value of FoS, and a score threshold of 0.01.

FIG. 6A shows experimental results applied to YOLO V3 using an input shape of 416, a value of FoS, and a score threshold of 0.01 for each of the standard models, and the first three embodiments of the Fast Non-Maximum Suppression Algorithm. As can be seen, embodiment 2 with the addition of FoS=1 fully matches the standard model for performance while saving over 89% of the calculations. With FoS=4 in the third embodiment results in a slight hit to performance but saves over 96% of the calculations. With Sigmoid_in_th=−0.375 in the first embodiment, performance drops even more but the percentage of saved calculations rises to over 99%.

Figure 6B:
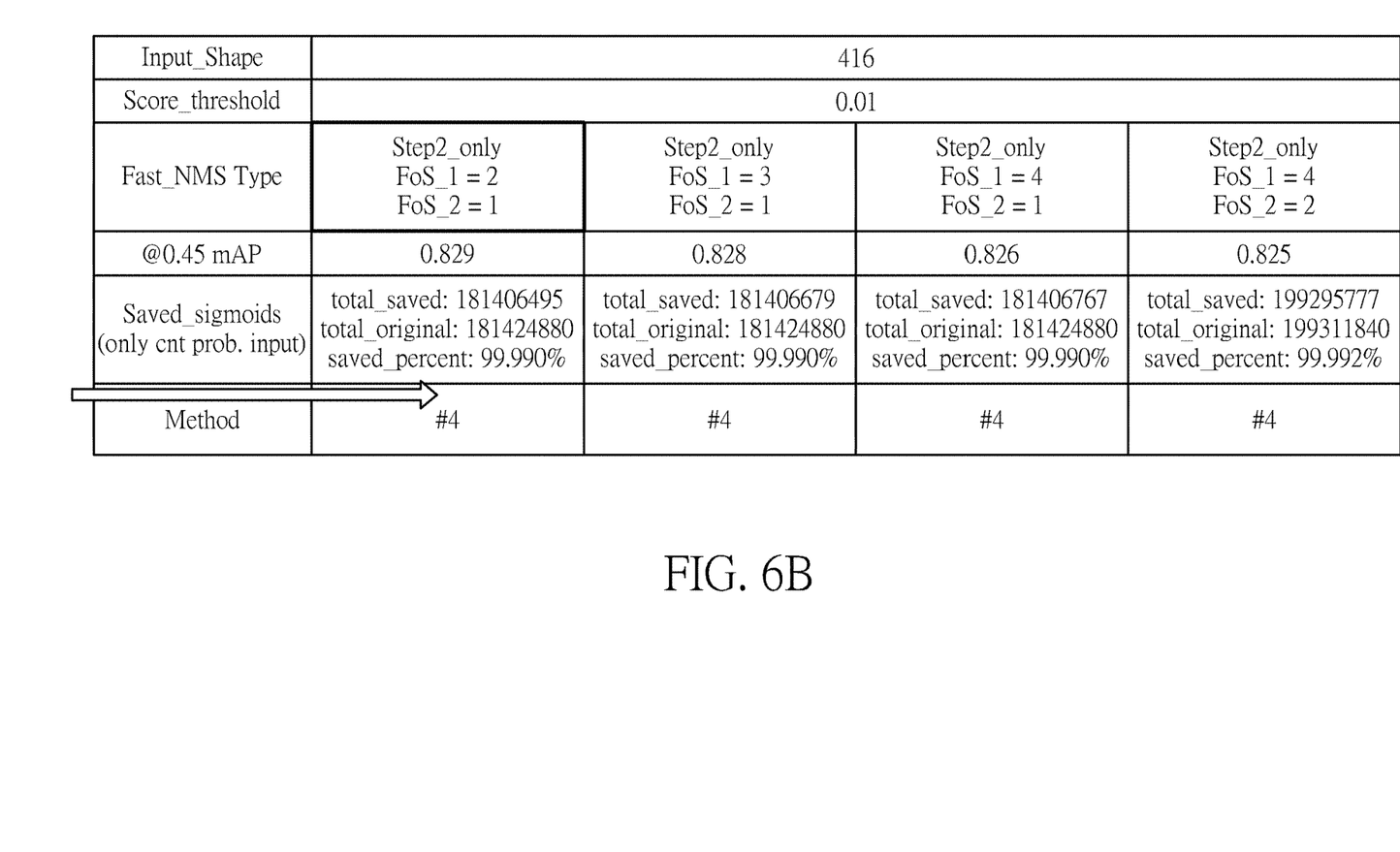
FIG. 6B shows experimental results applied to the same YOLO V3 using an input shape of 416, two values of FoS, and a score threshold of 0.01 for embodiment 4.

FIG. 6B shows experimental results applied to the same YOLO V3 using an input shape of 416, two values of FoS, and a score threshold of 0.01 for embodiment 4 of the Fast Non-Maximum Suppression Algorithm. In the results shown, only the results of step 2 (Table 2) are considered. The first column where FoS1=2 and FoS2=1, a performance of 0.829 is a full match with the standard model (See FIG. 6A) but the percentage of saved calculations rises to 99.990%. In comparisons, if FoS1=3 and FoS2=1, the number of saved calculations remains as high but the model suffers a slight performance hit, as it does when FoS1=4 and FoS1=1. The rightmost column shows results when FoS1=4 and FoS2=2, which saves a remarkable 99.992% of subsequent calculations, although suffers an even greater accuracy performance hit.

Figure 7:
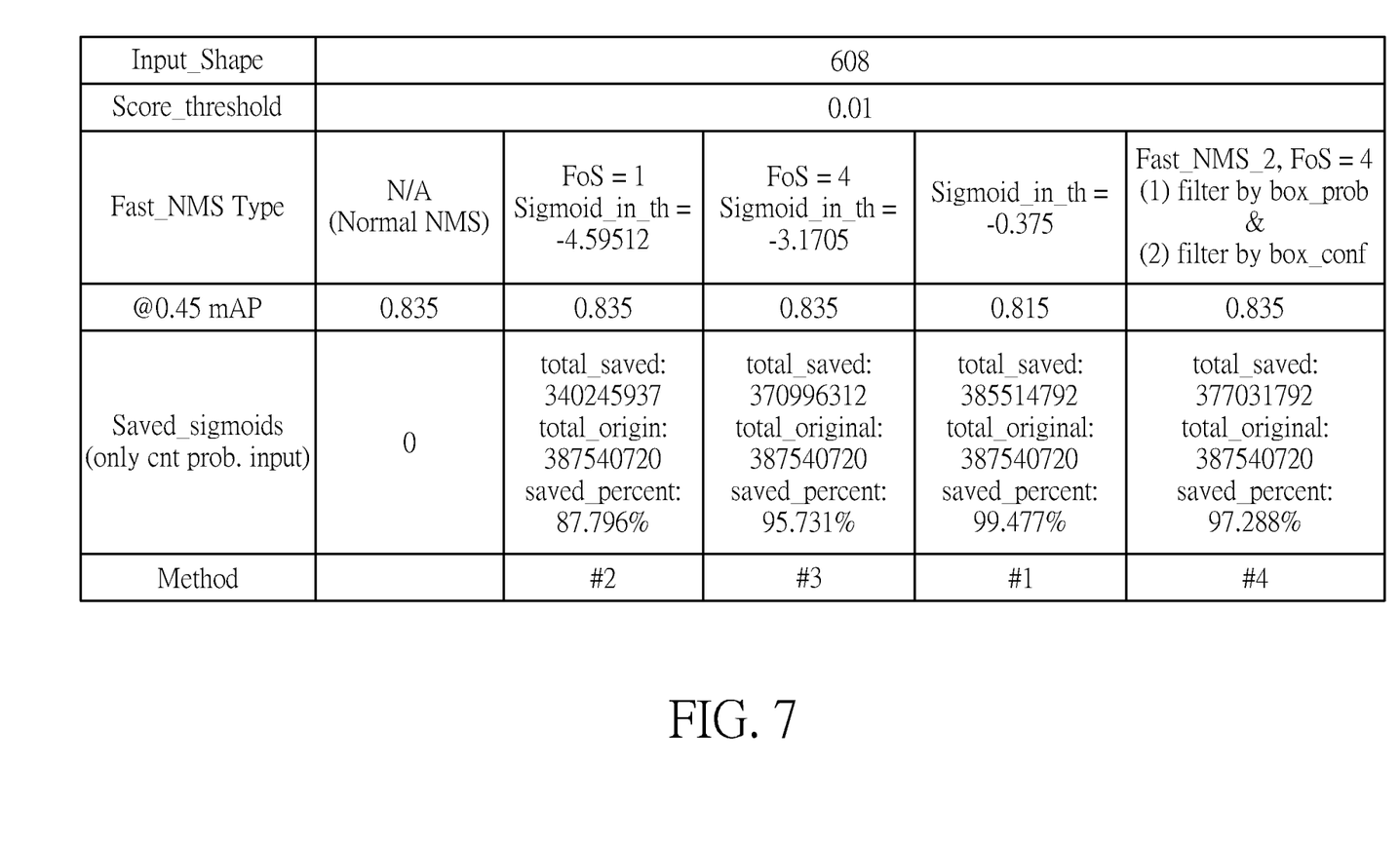
FIG. 7 shows experimental results applied to YOLO V3 using an input shape of 608, up to 2 values of FoS, and a score threshold of 0.01 for the four embodiments.

FIG. 7 shows experimental results applied to YOLO V3 using an input shape of 608, up to 2 values of FoS, and a score threshold of 0.01 for each of the standard models, and the four embodiments of the Fast Non-Maximum Suppression Algorithm. As can be seen, the standard (normal) NMS achieves an accuracy performance of 0.835. Embodiment 2 with FoS=1 and Sigmoid_in_th=−4.59512 maintains the performance while saving well over 87% of the required calculations. Embodiment 3 with FoS=4 and Sigmoid- _in_th=−3.1705 also maintains the performance while increasing the calculation savings to over 95%. For embodiment 1, using Sigmoid_in_th=−0.375, the savings in calculation rises to 99.477%, but the performance drops. Using embodiment 4, some results are still be determined. However, with FoS=4, the pre-filtering saved 97.288% of the calculations while matching the performance of the standard model.

In summary, by introducing a filter between step 1 and step 2 of the NMS algorithm for object detection as step 1a as described above to pre-emptively remove unnecessary bounding boxes from further consideration, the number of subsequent calculation can be vastly reduced, saving energy and increasing speed. This filter can be used with existing YOLO, SSD, and other anchor based post-processing methods without requiring a change in the pre-process or Deep learning model inference models currently used. The saving in energy make the above embodiments quite applicable to edge, embedded, and battery powered devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing a Fast Non-Maximum Suppression (NMS) Algorithm for object detection comprising:
   a processor getting original data output from a deep learning model inference output, the original data including a plurality of bounding boxes;
   the processor pre-emptively filtering out at least one bounding box of the plurality of bounding boxes from further consideration when applying the algorithm, the at least one bounding box filtered out according to a predetermined criteria;
   after pre-emptively filtering out at least one bounding box of the plurality of bounding boxes from further consideration, the processor processing data, using sigmoid functions or exponential functions, from bounding boxes of the plurality of bounding boxes not filtered out to generate processed bounding boxes;
   the processor calculating final scores of the processed bounding boxes; and
   the processor choosing a processed bounding boxes utilizing the final scores.

2. The method of claim 1, further comprising the processor pre-emptively filtering out at least one bounding box of the plurality of bounding boxes from further consideration when the at least one bounding box has a class score according to the deep learning model inference output less than a predetermined first threshold.

3. The method of claim 1, further comprising the processor pre-emptively filtering out at least one bounding box of the plurality of bounding boxes from further consideration when the at least one bounding box has a class score according to the deep learning model inference output less than a result of applying an inverse_sigmoid function to a predetermined confidence threshold.

4. The method of claim 1, further comprising the processor pre-emptively filtering out at least one bounding box of the plurality of bounding boxes from further consideration when the at least one bounding box has a class score according to the deep learning model inference output less than a result of applying an inverse_sigmoid function to a product of a predetermined confidence threshold and a predetermined Factor of Scaling.

5. The method of claim 1, further comprising the processor pre-emptively filtering out at least one bounding box of the plurality of bounding boxes from further consideration when the at least one bounding box, according to the deep learning model inference output, has a product of the result of applying a sigmoid function to the confidence score and the result of applying a sigmoid function to the class score that is less than a predetermined confidence threshold.

6. The method of claim 5, further comprising the processor pre-emptively filtering out at least one bounding box of the plurality of bounding boxes from further consideration when the at least one bounding box, according to the deep learning model inference output, has a class score that is less than a predetermined second threshold.

7. The method of claim 5, further comprising the processor determining whether the product of the result of applying a sigmoid function to the confidence score and the result of applying a sigmoid function to the class score is less than a predetermined confidence threshold by using a lookup table indexed according to the confidence score and class score.

8. The method of claim 7, further comprising the processor pre-emptively filtering out at least one bounding box of the plurality of bounding boxes from further consideration when the at least one bounding box, according to the deep learning model inference output, has a class score that is less than a predetermined third threshold.

9. The method of claim 7, wherein the predetermined third threshold is calculated by the processor according to a product of a score threshold and a first Factor of Scaling.

10. The method of claim 7, wherein a class probability for the at least one bounding box depends upon the associated box confidence score, and the predetermined third threshold is calculated by the processor according to a product of the class probability and a second Factor of Scaling.

* * * * *